(12) United States Patent
Pescatore et al.

(10) Patent No.: US 11,921,844 B2
(45) Date of Patent: Mar. 5, 2024

(54) FORENSIC DATA COLLECTION AND ANALYSIS UTILIZING FUNCTION CALL STACKS

(71) Applicant: Dellfer, Inc., Novato, CA (US)

(72) Inventors: Brian H. Pescatore, Purcellville,, VA (US); James Blaisdell, Novato,, CA (US); Xonia Ivonne McLaughlin, Bolton,, MA (US); Chetin Ersoy, Portsmouth,, NH (US); Kenneth J. Wante, Winchendon,, MA (US)

(73) Assignee: Dellfer, Inc., Novato, CA (US)

( * ) Notice: Subject to any disclaimer, the term of this patent is extended or adjusted under 35 U.S.C. 154(b) by 0 days.

(21) Appl. No.: 18/068,832

(22) Filed: Dec. 20, 2022

(65) Prior Publication Data
US 2023/0117901 A1 Apr. 20, 2023

Related U.S. Application Data

(62) Division of application No. 16/994,461, filed on Aug. 14, 2020.

(60) Provisional application No. 62/887,663, filed on Aug. 15, 2019.

(51) Int. Cl.
G06F 21/54 (2013.01)
G06F 8/41 (2018.01)
G06F 9/54 (2006.01)

(52) U.S. Cl.
CPC .............. *G06F 21/54* (2013.01); *G06F 8/433* (2013.01); *G06F 9/54* (2013.01); *G06F 2221/033* (2013.01)

(58) Field of Classification Search
CPC .... G06F 21/44–568; G06F 8/433; G06F 9/54; G06F 2221/033
See application file for complete search history.

(56) References Cited

U.S. PATENT DOCUMENTS

| 6,266,788 B1 * | 7/2001 | Othmer ................. G06F 11/366 714/38.11 |
| 2016/0147992 A1 * | 5/2016 | Zhao ....................... G06F 21/50 726/22 |

OTHER PUBLICATIONS

Dang et al., ReBucket: A Method for Clustering Duplicate Crash Reports Based on Call Stack Similarity, 2012. (Year: 2012).*

* cited by examiner

*Primary Examiner* — Trong H Nguyen
(74) *Attorney, Agent, or Firm* — Rupak Nag

(57) ABSTRACT

A novel compiler is described. The compiler is able to view source code of the application in its entirety and can do so from the inside. Unlike other tools which examine the forensic data from an application crash after the fact, from the outside, the compiler of the present invention can provide novel data on function call stacks and function profiles during runtime. The application may be stopped immediately during runtime to prevent further or potential damage, but the forensic data that is collected is focused and can be used to show where vulnerabilities exists in the application and how they were exploited. Hashes are taken of function call stacks and used as unique identifiers or thumbprints which can be used to reduce the volume of forensic data that needs to be analyzed after an attack.

2 Claims, 4 Drawing Sheets

Application ONE Function Call-Stack:

```
#0 in waitpid () from /lib64/libc.so.6       Thumbprint = hash (#0+#1)    = FEAB1121
#1 in do_system () from /lib64/libc.so.6
                                                                                        Thumbprint = hash (#0+#1+#2+#3+#4) = FCBA1547
#2 in bar-one ()
#3 in foo-one ()                             Thumbprint = hash (#2+#3+#4) = 97FE333D
#4 in main ()
```

Application TWO Function Call-Stack:

```
#0 in waitpid () from /lib64/libc.so.6       Thumbprint = hash (#0+#1)    = FEAB1121
#1 in do_system () from /lib64/libc.so.6
                                                                                        Thumbprint = hash (#0+#1+#2+#3+#4) = FEFD4432
#2 in bar-two ()
#3 in foo-two ()                             Thumbprint = hash (#2+#3+#4) = 34159CDF
#4 in main ()
```

Application ONE is attacked at waitpid()

Thumbprints:

Application Thumbprint ONE    = FCBA1547
Application Thumbprint TWO    = FEFD4432
Library libc.so.6 Thumbprint  = FEAB1121 at attack location We can see from the above that application 'ONE' was attacked and application 'TWO'
is susceptible to the same attack since the library attack vector thumbprint
"FEAB1121" is the same.

LIBRARY: /lib64/libc.so

Application ONE Function Call-Stack:

0 in waitpid () from /lib64/libc.so.6
1 in do_system () from /lib64/libc.so.6

PROGRAM: ONE

2 in bar-one ()
3 in foo-one ()
4 in main ()

LIBRARY: /lib64/libc.so

Application TWO Function Call-Stack:

0 in waitpid () from /lib64/libc.so.6
1 in do_system () from /lib64/libc.so.6

PROGRAM: TWO

2 in bar-two ()
3 in foo-two ()
4 in main ()

Application ONE and TWO are different applications which utilize the same shared library, in this case /lib64/libc.so. In this example there is a buffer overflow vulnerability in the `waitpid ()` function in `/lib64/libc.so`

FIG. 3

Application ONE Function Call-Stack:

0 in waitpid () from /lib64/libc.so.6
1 in do_system () from /lib64/libc.so.6
] Thumbprint = hash (#0+#1) = FEAB1121

2 in bar-one ()
3 in foo-one ()
4 in main ()
] Thumbprint = hash (#2+#3+#4) = 97FE333D Thumbprint = hash (#0+#1+#2+#3+#4) = FCBA1547

Application TWO Function Call-Stack:

0 in waitpid () from /lib64/libc.so.6
1 in do_system () from /lib64/libc.so.6
] Thumbprint = hash (#0+#1) = FEAB1121

2 in bar-two ()
3 in foo-two ()
4 in main ()
] Thumbprint = hash (#2+#3+#4) = 34199CDF Thumbprint = hash (#0+#1+#2+#3+#4) = FEFD4432

Application ONE is attacked at waitpid()

Thumbprints:

```
Application Thumbprint ONE    = FCBA1547
Application Thumbprint TWO    = FEFD4432
Library libc.so.6 Thumbprint  = FEAB1121 at attack location
```

We can see from the above that application 'ONE' was attacked and application 'TWO' is susceptible to the same attack since the library attack vector thumbprint "FEAB1121" is the same.

FIG. 4

FORENSIC DATA COLLECTION AND ANALYSIS UTILIZING FUNCTION CALL STACKS

CROSS-REFERENCE TO RELATED APPLICATIONS

This application claims priority under 35 U.S.C. § 119(e) and is a divisional application of U.S. application Ser. No. 16/994,461, filed Aug. 14, 2020, entitled "Forensic Data Collection and Analysis Utilizing Function Call Stacks", which further claims priority to U.S. Provisional Application No. 62/887,663, filed Aug. 15, 2019, entitled "Forensic Data Collection and Analysis Utilizing Function Call Stacks", the contents of which are hereby incorporated by reference.

BACKGROUND

1. Field

This disclosure generally relates to computer software and forensic data analysis. More specifically, it relates to collecting data during application execution, including entire function call stack data, to enable efficient examination of forensic data resulting from attacks on software systems, including IoT systems.

2. Description of the Related Art

Ensuring software and network security is of paramount importance. As such, there are many debugging tools and forensic software currently available that are able to collect data when something goes wrong or if software is behaving unusually or in unexpected ways because of, for example, a bug or a hack. The tools available are able to capture volumes of data for analysis so that programmers and security experts can see what was happening when an unexpected event occurred.

One of the issues with these tools is the volume of forensic data that comes from them; many of them may overcompensate and collect immense amounts of data. Security experts and others are inundated with forensic data that may result from an attack, especially when the attack is in the context of a large network, especially an Internet of Things (IoT) environment. The data generated from these tools may show exactly what was executing when they caught the hack or attack, what resources were being used when it happened, what files were open, which network connections were active, and so on. When these types of data are collected in a large IoT system where there may be hundreds or thousands of devices, such as an entire fleet of cars, devices, sensors, and the like, the amount of forensic or attack/incident-related data can be overwhelming and make it difficult to do a rapid response analysis.

Moreover, it is important to note that with IoT systems where there are many attacks because there are many similar devices, the forensic data collected may be one or two sets of data that are repeated hundreds or thousands of times with only small variations in each repetition. As such there may be same or similar patterns of data that are repeated over and over again by the forensic or debugging tools. Basically, many of the attacks on devices in an IoT system are similar and so the forensic data for each attack are very similar, but a significant drawback of these tools is that when the forensic data is collected, this similarity is not made evident.

Although, there are compilers from Open Source community that have embedded technology and stack probes in compilers to ensure that a function call stack is not compromised while an application is running, these can be easily manipulated or highjacked. They also lack data on the attack, such as where the attack occurred and the like.

Artificial Intelligence learning is being used to generate behavior of apps by running an application a statistically significant number of times to obtain an accurate picture of the behavior of the application. A wide range of various types of test cases are run to see how the application reacts. These function call graphs are used to generate a behavior model of the application. This is done before the application goes into production and is generally a time and resource consuming task.

Although the forensic data may provide a lot of detailed information about what was executing and create a snapshot of what was happening, as noted above, the actual analysis of the data may end up simply being, what may be referred to as, a binary analysis, that is, they can only determine that the software was not running the way it was supposed to or should have been running. Accordingly, there is a need for software tools to improve the analysis of forensic data or data that results from an attack on a software system.

SUMMARY

In one aspect of the invention, a method of compiling a software program using a novel compiler is described. Multiple probes or instrumentations are inserted into an executable during compile time. These probes can be inserted in various places. In one embodiment, they are inserted before and after a function call. In other embodiments, they can be inserted before a function call is made. Generally, they are inserted in places that enable deriving a function call stack or function profile. The compiler analyses code during compile time to identify functions in the code that are stored in indirect function call variables. Using function call graphs, the compiler generates one or more behaviour models of the software program. It also generates call stack function profiles and can identify a function call stack that led to an attack of the program.

In another aspect of the invention, a method of preventing attacks in multiple software applications is described. A first set of function names in a first function call stack of a first application is identified. A hash (first hash) is taken of a first segment of the first set of function names. Another hash (second hash) is taken of a second segment of the first set of function names. Another hash (third hash) is taken of the entire segment of the first set of function names. A second set of function names in a second function call stack of a second application is identified. A hash (fourth hash) is taken of a first segment of the second set of function names from the second application. Another hash (fifth hash) is taken of a second segment of a second set of function names from the second application. And another hash (sixth hash) is taken of an entire segment of the second set of function names of the second application. The first hash value, second hash value, and the third hash are compared with the fourth hash value, the fifth hash value, and the sixth hash value for matches to prevent attacks on the first application and the second application.

BRIEF DESCRIPTION OF THE DRAWINGS

FIG. 3 shows two example function call stacks for two applications in accordance with one embodiment; and FIG. 4 illustrates one scenario of a thumbprint used to prevent or predict an attack on an application in accordance with one embodiment.

DETAILED DESCRIPTION

Figure 1:
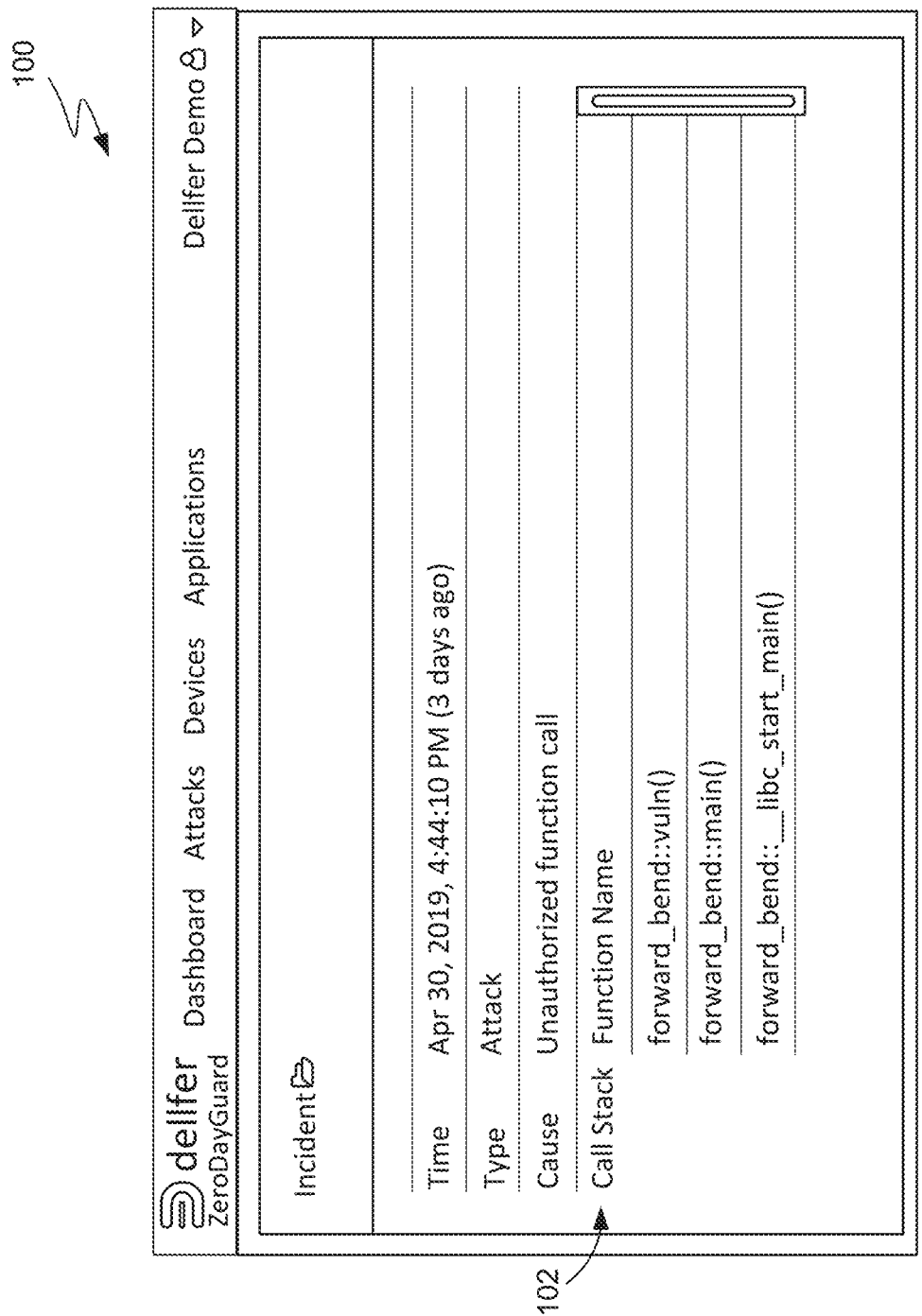
FIG. 1 is an illustration of an incident or attack window showing a function call stack in accordance with one embodiment.

As is well known, there are several types of attacks that can occur with software. The amount of forensic data generated by existing tools may depend on the type of attack and on the characteristics of the system running the software. One type of attack is referred to as a Zero Day Attack. As is known in the field, Zero Day Attacks are attack vectors within software which are not known to the developer and may be eventually exploited by an attacker. The attack vectors exist on day one of releasing. The vulnerability in the software is typically known to the attacker or hacker. The embedded vulnerability is typically not known to the software developers or not caught by quality assurance or others and, as such, the attack occurred on "day zero," that is, on the first day the software is executed and can be exploited at any time thereafter.

There are several different types of zero day attacks. One type is a central buffer or in-memory overflow attack. This type of attack is known to those skilled in the field of software security. Data storage is provided in the software code. In one instance, an input device provides too much data for that data storage thereby making the program execute abnormally. The application stack (the stack used by the processor) overflows because, for example, there was too much data by the input device and the return address or return function call was overwritten. A hacker will exploit this zero day vulnerability by crafting the input data to be that of valid instruction address in the application which the hacker wishes to call. This is also known as return-oriented programming (ROP).

Another type is jump-oriented programming (JOP). JOP attacks are also buffer overflow attacks but instead of the call stack return address being corrupted, a function pointer on the stack is overwritten and when the indirect call is executed it jumps to an unintended bogus address. Such JOP attacks, like ROP attacks happen at runtime. Instrumentation is inserted so that indirect or forward jumps that involve bogus functions may be prevented. Functions and how they are being called are validated. What is being called is also validated with the correct function call signature. Code is analyzed during compilation to identify all types of functions in the code that can or may be stored in these indirect function call variables and it is also noted how or manner in which that function should be called. Instrumentation is inserted into the code at such locations to enable detection of indirect and forward jump tampering.

One methodology used to check buffer overflow attacks is referred to as control flow integrity or CFI. With CFI, analysts can check whether a return address has been over written (in its simplest form: function C is supposed to return data to function B, but instead function C returns data to a bogus function or address, that is, function B has been over-written by the bogus address). By maintaining CFI, the system maintains application control flow as it was intended when the application was built. CFI is one of the tools used to collect forensic data. When a buffer overflow attack occurs now, the application or software is compromised, that is, the attacker is able to get the application to behave in ways it should not, or it halts entirely. In the case of an IoT system, the entire system is stopped (e.g., an entire fleet of cars is immobilized, cameras are turned off, or ATMs are disabled, and the like). When an application is shut down suddenly in this manner (primarily so that further damage is immediately thwarted, but also partly out of panic), huge amounts of forensic data are collected, as described above, and stored somewhere, typically on remote servers in the cloud to be examined in a cumbersome and resource-intensive "post mortem."

In some embodiments, the compiler of the present invention is used to distill the potentially overwhelming volume of forensic data down to what the actual attack looks like. For example, is it the same attack against all devices or may be the same attack on one class of devices and a different attack on a different class of devices, and so on.

In one embodiment, the inventive concept is implemented through a novel compiler. The compiler is able to view the source code of the application in its entirety; it can see the big picture and, by virtue of the fact that it is a compiler, it can do so from the inside. Unlike other tools which examine the forensic data from an application crash after the fact, from the outside, the compiler of the present invention can provide novel data as described below. The application, compiled using the novel compiler described here, may be stopped immediately during runtime to prevent further or potential damage, but the forensic data that is collected is focused and can be used to show where vulnerabilities exists in the application and how they were exploited. In other embodiments, the application may not be stopped. A remediation policy component of the system allows the user to decide how to fix an attack when it occurs. For example, a user is given an option to stop execution of the application, allow the attack to continue and report it or notify a third party, analyze and then report it, and so on. The remediation policy is invoked when an attack or bug is detected.

In one embodiment, with respect to central buffer overflow attacks and CFI noted above, the compiler may provide or show the actual call stacks of the program when it was executing and when the attack occurred, including resource data like open file paths and network connection end-point detail.

In one embodiment, the compiler (e.g., ZeroDayGuard by Dellfer of Novato, California) takes the application source code, compiles the code and creates executable code. The executable is linked and executes on the target IoT device. The compiler also inserts what may be referred to as protection probes into the executable code so that it is possible to detect anomalous or other bad behavior by the application. Given that these protection probes are inserted or embedded in the executable code during compile time, the protection is said to be 'built into' the application. In one embodiment, probes are placed by the compiler at the beginning and end of function calls in the application. These probes can be characterized as prolog and epilog probes for ROP. With JOP there are prolog and epilog probes and, in addition, there is a mechanism for providing a preview or 'look before executing', referred to as JOP "Launch Pads" which validates that the function that is being called has a valid 'cookie' that the compiler logic has inserted. In another embodiment, this instrumentation can be added to executables or pre-built binaries through a version of the compiler that acts on binary images or executables. While the application is executing, many things are being tracked, one of them being the function call stack.

One of the objectives is to determine where in the code vulnerabilities exist and whether it is the same vulnerability that is occurring in each device that is executing the application. This assists extensively in analyzing and generally assessing the forensic data. As mentioned, the function call stack is a particularly important piece of data, providing insight into exactly what functions are being called, in what order, and when they are being called.

In one embodiment, the compiler analyzes application code while compiling the code and generates a behavior model of the code and function call graphs used to generate the model. It enables identification of the function call stack that led to the attack. Because the behavior model and call graphs are generated during compile time, there is time and resource efficiency. The executable from the compiler of the present invention has built-in function call graph information, i.e. function profiles. It is able to generate call stack function profiles during compile time. As such, there is "built-in" call graph information when the application executes. The function call stacks are generated at the inception of the attack. A significant increase in efficiency given that behavior models and function call graphs do not, have to be generated using conventional AI learning. This data is reported to a rest API. This may be in the cloud or on premises. Reports can be generated. This software component of the system also creates the thumbprint of the call stack attack or anomaly. In one embodiment, it may enable the matching of the thumbprint to the CVE database, as described below.

In one embodiment, the user sees a dashboard showing different views and perspectives of the forensic data of an Event or attack. One window in the dashboard may be referred to as an Incident box or file. It shows the time of the incident, the type, the cause (e.g., unauthorized function call), and the call stack. It can show these data, in particular the function call stack, because at the time the application was compiled protection probes are inserted into the executable code. These probes are able to perform a number of different operations, one of them is keeping track of the functions called at the time of the attack and the order in which these functions are called.

For example, in FIG. 1, Incident window 100 has a call stack 102 entry comprised of function names: forward_bend::vuln( ); forward_bend::main( ); and forward_bend::_libc_start_main( ). For each attack, for example, on a sensor, device, ATM, or car, to name just a few examples, an incident report is generated which shows a specific call stack of functions. As such, there may be hundreds or thousands of function call stacks, one for each incident. If the attack on each device or thing in an IoT system is the same, many of the function call stacks will be the same or very similar, indicating that the IoT system was essentially hit by one or a few similar attacks.

In one embodiment of the present invention, large volumes of forensic data are examined by looking at hash values of each of the function names. That is, a hash of one or combinations of the ASCHII call-stack function name hierarchy is created. A hash value of such a combination is referred to herein as a thumbprint. Hashes of other aspects or features of the functions may also be used. In the described embodiment, more generally, a hash is taken of all the ASCHII text of combinations of names in the call stack. This hash is a unique, one-of-a-kind identifier of the specific attack, essentially, a thumbprint of the attack.

In another embodiment, the compiler does not take a hash of the full name of each function in the stack. It may take a hash of the bottom few layers or function names in the call stack. This may not provide as specific a thumbprint of the incident, but may be sufficiently unique to show, when the analysis is performed, that the same attack is occurring on many or all of the devices in the IoT system. In this embodiment, hashes are taken of segments of function call stacks. With the thumbprints of the segments, it may be possible to identify similar or identical attack sequences, as opposed to taking thumbprints of each and every function in the call stack. For example, one segmentation may occur at a software library boundary if an application is dynamically linked. Calls to libraries, not normally embedded in the application code, may produce thumbprints that reveal that the thumbprint is repeatedly used in, for example, open source code, and not in the application code itself. More generally, by taking thumbprints of segments, it may be possible to narrow down the location of a vulnerability to a specific code path.

Figure 2:
FIG. 2 is an illustration of an attacks window showing multiple thumbprints in accordance with one embodiment.

FIG. 2 shows an Attacks window 200. A column of thumbprints 202 is shown on the left side, in this case, ten thumbprints. To the right of the thumbprint column is a column of "victims" or names of functions involved in the attack. As described above, the thumbprint is a hash of the text of the function name. In this example, there are 10 different function names and therefore 10 different thumbprints. Also shown is an "Incidents (total)" column. This shows the number of times the function in that row was attacked. In the case of function "forward_bend_vuln( )" having thumbprint 53b2a6, there are three incidents total. The windows at the bottom provide more information on a highlighted thumbprint, such as attack history, applications impacted, and devices impacted.

FIG. 3 shows a function call-stack for Application ONE and a function call-stack for Application TWO. They are two different applications. Application ONE has a call stack comprising:
2 in bar-one( )
3 in foo-one( )
4 in main( )
Application TWO has a call stack comprising:
2 in bar-two( )
3 in foo-two( )
4 in main( )
Both applications share the same library: /lib64/libc.so
0 in waitpid( ) from /lib64/libc.so.6
1 in do_system( ) from /lib64/libc.so.6
In this example there is a buffer overflow vulnerability in the 'waitpid( )' function in the '/lib64/libc.so' library.

FIG. 4 illustrates one scenario of how a thumbprint may be used to prevent or predict an attack on an application. It shows the same two applications from FIG. 3 each having the same function stacks as described above. A hash is taken of the concatenation of the ASCHI text comprising the letters and numbers of functions #0 and #1 of Application ONE: hash(#0+#1) to create a first thumbprint: FEAB1121. A hash is taken of the concatenation of the letters and numbers comprising functions #2, #3, and #4 of Application ONE: hash(#2+#3+#4) to create a second thumbprint: 97FE333D. The hash function used should be the same within the context of an entire system or customer application. Another hash is created by concatenating the letters, numbers, and symbols (ASCHII text) of all five functions to derive a third thumbprint: FCBA1547. As such there are three thumbprints for Application ONE, but the primary one is the hash of the entire function call stack: FCBA1547.

In a similar manner and using the same hash function, Application TWO has a thumbprint for functions #0 and #1 which is the same as the thumbprint for the same two library functions in Application ONE: FEAB1121. The thumbprint for functions #2, #3, and #4 in Application TWO is 34199CDF (different from Application ONE). And the primary or main thumbprint for the entire function call stack for Application TWO is FEFD4432 which is also different from the primary thumbprint for Application ONE: FCBA1547.

Thumbprints can be used in a number of different ways. One is to predict or prevent an attack on an application based on an attack on another application by examining attack vector thumbprints, that is, is the thumbprint of the function call stack where the incident occurred present in other applications. In one example, there is an attack on Application ONE at library function waitpid( ) from library 'lib64/libc.so.6'. Thus the thumbprint of the attack location is FEAB1121. This is referred to as the library attack vector.

The library attack vector thumbprint FEAB1121 is also present in Application TWO. As such, Application TWO is susceptible to the same attack or incident as the one that occurred in Application ONE. Steps can be taken to prevent the same incident occurring in other applications which have segments of the call stack that has the same thumbprint as the attack vector. In some IoT systems, there may be thousands of such applications that have that attack vector thumbprint. It is now possible to prevent or at least be prepared for the incidents to occur. More to the point, it makes it far more efficient in examining the onslaught of forensic data that may stem from the multiple attacks.

Data flow integrity (DFI) and preventing application tampering are methodologies that produce forensic data that may also be analyzed using thumbprints as described above.

In another embodiment, a thumbprint is mapped to codes in a database, such as the CVE database, of known vulnerabilities, attacks, and exploitations. An attack is detected using the compiler and techniques of the present invention and a thumbprint is generated for the attack. The thumbprint is then mapped to the CVE database. If there is a mapping then information on how to fix the attack can be retrieved. If there is no mapping to known CVEs, the new attack may be reported to the CVE database operator and the database may be updated. As noted, the thumbprints generated from the hash functions of the function call stacks are linked to CVE identification codes. This takes place when an attack is reported.

In one embodiment, the compiler has a code-signing feature that enables validation of an application binary or shared library binary. A binary is code-signed by the compiler to ensure that is has not been tampered with, that is internal bits or other content has not changed in the binary image since it was code-signed by compiler. With code-signing, the compiler reads the bits of the binary and then adds a new section to the ELF header with a signature which contains a digital signature based on a private key and other data. When a compiler code-signed binary is encountered by a corresponding loadable kernel module, the signature is validated with the corresponding public key. If the validation fails, the binary image is not loaded.

In another embodiment, in addition to enforcing a generated call flow graph, on Linux systems, the compiler validates that the actual Linux system call which is attempted is, in fact, in the source code when compiled with the compiler of the present invention. Manipulation of Linux system calls, and even the ability to perform an unwanted system call, is at the center of a preferred type of attack. It is known in the art that many attacks which do actual harm require system call execution. As such, attacks which simply manipulate the call stack to crash a program are generally not that harmful; there is usually third-party middleware available which will restart a crashed/failed application. However, an attack which can perform system calls can do much more damage to, for example, an IoT system. Prevention of unwanted system calls is crucial. When a system call is made, a traversal is made from 'user' space to 'kernel' space (unlike a normal function call which is entirely in user space'). When an attack crosses the chasm from user to kernel space and a single assembly register contains the identifier of the actual system call, this register can be hacked. And if so, the compiler detects the modification in the compiler's loadable kernel module.

What is claimed is:

1. A method of preventing attacks in a plurality of software applications comprising:
    identifying a first set of ASCHII function names in a first function call stack of a first application;
    taking a first hash of a first segment of the first set of ASCHII function names to generate a first hash value, taking a second hash of a second segment of the first set of ASCHII function names to generate a second hash value, and taking a third hash of all of the first set of ASCHII function names to generate a third hash value;
    identifying a second set of ASCHII function names in a second function call stack of a second application different from the first application;
    taking a fourth hash of a first segment of the second set of ASCHII function names to generate a fourth hash value, a fifth hash of a second segment of the second set of ASCHII function names to generate a fifth hash value, and a sixth hash of all of the second set of ASCHII function names to generate a sixth hash value;
    comparing the first hash value, the second hash value, and the third hash value with the fourth hash value, the fifth hash value, and the sixth hash value for matches; and
    preventing attacks on the first application or on the second application based on the matches.

2. A method as recited in claim 1 wherein hash values of function call stack segments that are the same in the first application and in the second application are used to predict attacks on the first application and on the second application.

* * * * *